Sept. 8, 1942.  E. H. PIRON  2,295,269

VENTILATED WHEEL

Filed Nov. 3, 1938

INVENTOR.
EMIL H. PIRON
BY
ATTORNEY.

Patented Sept. 8, 1942

2,295,269

UNITED STATES PATENT OFFICE 2,295,269

VENTILATED WHEEL

Emil H. Piron, New York, N. Y., assignor to Transit Research Corporation, a corporation of New York Application November 3, 1938, Serial No. 238,545

18 Claims. (Cl. 295—11)

This invention relates to resilient wheels for rail vehicles and has for its object to provide a resilient wheel which can be employed with conventional brakes which act on the periphery or tire thereof.

Wheels including elastic elements sufficiently resilient to provide an amount of deflection of the hub with respect to the tire are coming into wide uses. These wheels are constructed of two relatively movable main plates radiating from the hub, and a tire carrying plate between the main and shear elements composed of an elastic plastic material. Cars equipped with such wheels are ordinarily equipped with the so-called dynamic brakes and with magnetic track brakes in order to relieve the air operated tire contacting shoes of major braking functions. The reason for this is that, if braking were accomplished by frictional contact of a brake shoe with the tire, the tire would become heated and a substantial amount of the heat would be conducted into the web or tire carrying plate thus rapidly deteriorating the elastic springing elements. The principal object of this invention is to provide a wheel constructed as above described and in which the tire carrying plate is spaced from the elastic elements sufficiently to prevent damage by the temperature which this plate may be expected to attain.

A further object of the invention is to provide air spaces and air impelling means between the tire carrying plate and the springing elements so arranged that a substantial flow of air will take place through these spaces during rotation of the wheel.

A specific object is to provide springing elements composed of a mass of elastic plastic material having parallel faces to which metallic discs are surface-bonded in combination with means to prevent warping or other distortion thereof when in pressure assembly in a wheel.

Other objects and advantages will become more fully apparent as reference is had to the accompanying drawing wherein my invention is illustrated, and in which.

Figures 1, 2, 3, 4:
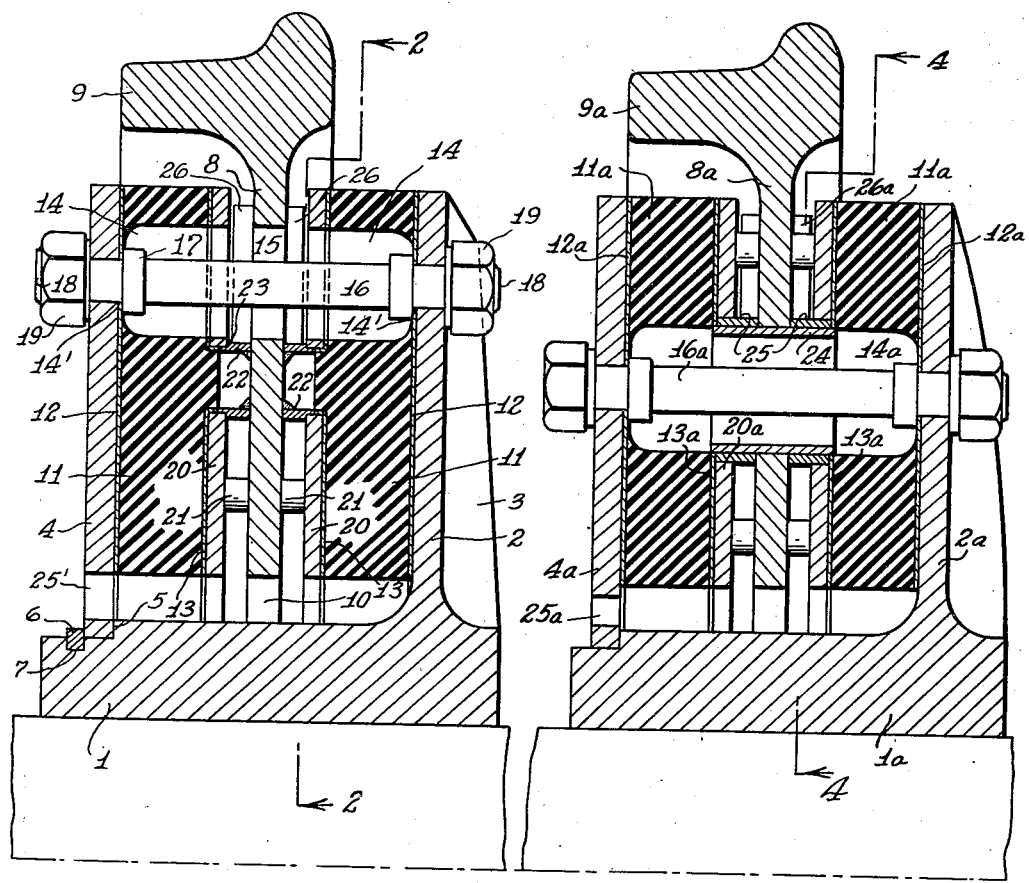
Fig. 1 is a longitudinal diametric section taken through half a rail wheel constructed according to my invention.
Fig. 2 is a transverse radial section taken along the line 2—2 of Fig. 1.
Fig. 3 is a section similar to Fig. 1 showing a modified form thereof.
Fig. 4 is a view similar to Fig. 2 taken along the line 4—4 of Fig. 3.

More particularly 1 indicates a wheel hub having a main plate 2 cast, welded or otherwise fixedly secured thereto in transverse radial relation and preferably webbed at 3 for strength. A second main plate 4 radiates from the hub 1 and is longitudinally movable thereon toward and away from the plate 1. This plate 4 may be secured in fixed assembly on the hub 1 in any desired way, but is illustrated as contacting a shoulder 5 formed on the hub 1 and as being held thereagainst by a snap ring 6 in a groove 7 formed in the hub.

Between the plates 3 and 4 is a tire carrying plate 8 having a rail contacting tire 9 carried thereby. This plate has a central opening 10 therethrough of substantially greater diameter than the diameter of the hub 1 in order to provide for relative movement between the tire and hub. Between the plate 8 and the main plates 3 and 4 are springing elements each of which is composed of a mass of elastic plastic material 11, such as rubber having parallel faces to which relatively thin metallic plates or discs 12 and 13 of metal are surface-bonded. Prior art shows two general types of wheel springing elements and Fig. 1 may be considered a section taken through either of these types as the sections would be identical. One of these types is in the form of a single toroid of rubber concentric with the axis of the hub 1 and the other is in the form of a plurality of toroids or discs grouped about the axis of the hub 1 relatively equidistant therefrom. The first described is the preferred form for the reason that the shear area is greater.

The elements 11 and the plates 12 and 13 have a plurality of aligned openings 14, 14' therethrough which align with openings 15 in the plate 8. Through each set of these openings a bolt or pin 16 is inserted. This pin has two shoulders 17 for contact with the plates 12 and threaded outer end portions 18 to receive the nuts 19 outwardly of the plates 3 and 4. The shoulders 17 act as spacers and the nuts 19 act to draw the main plates against the shoulders. The main plates 3 and 4 are thus rigidly connected so that a deflection of one plate will be transferred to the other plate so that both plates resist the deflecting force. It will be noted that the openings 14 through the elastic elements and the opening 15 through the plate 8 are of substantially larger diameter than that of the bolt 16 to provide for deflection of the tire 9 with respect to the hub 1. The openings 14' through the discs 12, however, are preferably substantially equal to the diameter of the bolt so that the bolts serve as dowels therefor to prevent displacement of the plates 12 with respect to the main plates with which they are in frictional engagement.

The inner discs 13 are, preferably, reenforced by auxiliary discs 20. If preferred, the discs 13 and 20 may be integral or in two pieces welded or otherwise fixedly secured together. These discs together are substantially thicker than the discs 12 for the reason that they do not have surface engagement with any radial plate 3, 4 or 8.

The plates 13 are retained in spaced relation with respect to the plate 8 by means of the spacers 21 and also by means of the dowels 22 welded or otherwise fixedly secured to the plate 8 each of which has a shoulder 23 against which a disc 20 rests, the outer end of each of these dowels being reduced in outside diameter for extension through both discs 12 and 20. These dowels 22 are preferably hollow and are at different distances from the center of the hub than any portion of the openings 14 and 15.

The spacers 21 may be integral either with the plates 20 or with the tire carrying plate 8. It is preferred that these spacers and also the dowels be secured to the plate 8.

In Figs. 3 and 4 the structure is similar to that described except that the dowels and the spacer bolt are concentric and the remaining structure has been arranged to permit this relation. The two main plates 2a and 4a radiate from the hub 1a. The tire carrying plate 8a for the tire 9a resides between the plates 2a and 4a and springs composed of elastic shear elements 11a each surface-bonded to the metallic discs 12a and 13a separate the plates, the plates 2a and 4a exerting substantial continuous compression on the shear elements. The discs 13a are reinforced by thicker sections 20a which are maintained in spaced relation with the plate 8a by a multiplicity of spacers 21a arising either from the surfaces of the plate 8a or from the surfaces of the discs 20a.

Dowels are also provided both as spacer and aligning means. In this case, the opening 14a through the shear elements 11a is concentric with the bolt 16a with which it has substantial clearance and also with a tubular element 24 carried by and fixed to the plate 8a and with which the bolt 16a also has substantial clearance. Dowels 25 arising from the elements 13a and 20a are of cylindrical form to closely fit the element 24, the ends of the dowels abutting the plate 8a in pressure relation.

In order to enhance the air flow through the space separating the plates 8 and 20 in Fig. 1 and the plates 8a and 20a in Fig. 3, a plurality of openings 25' and 25a, respectively, are provided between the hub and the shear elements, and vanes 26 and 26a, similar to those of a centrifugal air blower, are provided to induce an air flow incident to rotation of respective wheels.

What is claimed is:

1. In a wheel, a hub having two main relatively movable plates radiating therefrom, a tire carrying plate between said main plates, springs comprising elastic shear elements interposed between said tire carrying plate and each of said main plates, and air passageways between said springs and said tire carrying plate.

2. In a wheel, a hub having two main relatively movable plates radiating therefrom, a tire carrying plate between said main plates, springs comprising elastic shear elements interposed between said tire carrying plate and each of said main plates, and spacer means separating said springs from said tire carrying plate.

3. In a wheel, a hub having two main relatively movable plates radiating therefrom, a tire carrying plate between said main plates, springs comprising elastic shear elements having metallic discs surface-bonded to each side thereof interposed between said tire carrying plate and each of said main plates, and means spacing the discs adjacent said tire carrying plate from said tire carrying plate whereby an air gap is provided therebetween.

4. In a wheel, a hub having two main relatively movable plates radiating therefrom, a tire carrying plate between said main plates, springs comprising elastic shear elements interposed between said tire carrying plate and each of said main plates, and spacer means comprising shouldered dowels separating said springs from said tire carrying plate.

5. In a wheel, a hub having two main relatively movable plates radiating therefrom, a tire carrying plate between said main plates, springs comprising elastic shear elements having metallic discs surface-bonded to each side thereof interposed between said tire carrying plate and each of said main plates, the metallic discs adjacent said tire carrying plate and said tire carrying plate having interfitting dowel means shouldered to constitute also spacer means for separating said discs from surface contact with said tire carrying plate.

6. In a wheel, a hub having two main relatively movable plates radiating therefrom, a tire carrying plate between said main plates, springs comprising elastic shear elements having metallic discs surface-bonded to each side thereof interposed between said tire carrying plate and each of said main plates, the discs adjacent said tire carrying plate being of reinforced construction for resistance against warpage, and means spacing said reinforced plates from said tire carrying plate.

7. In a wheel, a hub having two main relatively movable plates radiating therefrom, a tire carrying plate between said main plates, springs comprising elastic shear elements interposed between said tire carrying plate and each of said main plates, and means dissipating the heat in said tire carrying plate prior to entry into said springs comprising a flow of air between said springs and said tire carrying plate.

8. In a wheel, a hub having two main relatively movable plates radiating therefrom, a tire carrying plate between said main plates, springs comprising elastic shear elements having metallic discs surface-bonded to each side thereof interposed between said tire carrying plate and each of said main plates, the discs adjacent said tire carrying plate being of reinforced construction for resistance against warpage, spacer means forming air passages between said reinforced discs and said tire carrying plate, and means positioned radially inwardly of said springs inletting a flow of air to said air passages.

9. In a wheel, a hub having two main relatively movable plates radiating therefrom, a tire carrying plate between said main plates, springs comprising elastic shear elements having metallic discs surface-bonded to each side thereof interposed between said tire carrying plate and each of said main plates, means separating said shear elements from the tire carrying plate to form an air passage therebetween, and a plurality of bolts extending transversely through said wheel directly through and in spaced relation with said shear elements and said tire carrying plate, said bolts each having a shoulder in contact with the discs adjacent said main plates, and a nut on each end of each of said bolts drawing said discs and said main plates in non-slipping engagement.

10. In a spring device, three parallel plates separated by springs each comprising an elastic shear element having metallic members surface-bonded to opposed faces thereof, the intermediate one of said plates being relatively movable with respect to the other two plates to impose shear loading on said shear elements, tubular elements extending through said intermediate plate and spacing the springs therefrom, a plurality of bolts each extending transversely through one of said tubular elements in movable relation therewith and also through said members and said shear elements and having substantial clearance with said intermediate plate and said shear elements, said bolts having nuts on each end thereof to draw said other plates toward each other thereby imposing substantial compression on said elements, said bolts each having a shoulder near each end thereof said bolts each having a portion between its shoulder and its nut constituting dowel means for securing those members adjacent said other plates to said other plates.

11. In a spring device, three parallel plates separated by springs each comprising an elastic shear element having metallic members surface-bonded to opposed faces thereof, the intermediate one of said plates being relatively movable with respect to the other two plates to impose shear loading on said shear elements, tubular elements extending through said intermediate plate and spacing the springs therefrom, a plurality of bolts each extending transversely through one of said tubular elements in movable relation therewith and also through said members and said shear elements and having substantial clearance with said intermediate plate, with those members adjacent said intermediate plate and with said shear elements, said bolts having nuts on each end thereof to draw said other plates toward each other thereby imposing substantial compression on said elements, said bolts each having a shoulder near each end thereof said bolts each having a portion between its shoulder and its nut constituting dowel means for securing those members adjacent said other plates to said other plates, and dowel means securing those members adjacent said intermediate plate to said intermediate plate.

12. In a spring device, three parallel plates separated by springs each comprising an elastic shear element having metallic members surface-bonded to opposed faces thereof, the intermediate one of said plates being relatively movable with respect to the other two plates to impose shear loading on said elements, a plurality of bolts each extending transversely through said plates, said members and said elements, and having substantial clearance with said intermediate plate, those members adjacent said intermediate plate and said shear elements, said bolts having nuts on each end thereof to draw said other plates toward each other thereby imposing substantial compression on said elements, said bolts each having a shoulder near each end thereof said bolts each having a portion between its shoulder and its nut constituting dowel means for securing those members adjacent said other plates to said other plates, and dowel means concentric with said bolt and having one part thereof anchored in the clearance opening through said intermediate plate and a mating part between each of said members and said intermediate plate.

13. In a wheel, a hub, a tire, radial supporting means connected to the hub, radial supporting means connected to said rim, one of said supporting means comprising a pair of relatively movable plates, the other supporting means comprising a plate disposed between the first two plates, springs comprising elastic shear elements interposed between the first two plates and the third plate, and air passageways between the springs and the supporting means which are connected to said rim.

14. In a wheel, a hub, a tire, radial supporting means connected to the hub, radial supporting means connected to said rim, one of said supporting means comprising a pair of relatively movable plates, the other supporting means comprising a plate disposed between the first two plates, springs comprising elastic shear elements interposed between the first two plates and the third plate, air passageways between the springs and the third plate, and means for inducing an air flow through said passageways incident to rotation of the wheel.

15. In a wheel, a hub, a tire, radial supporting means connected to the hub, radial supporting means connected to said rim, one of said supporting means comprising a pair of relatively movable plates, the other supporting means comprising a plate disposed between the first two plates, springs comprising elastic shear elements interposed between the first two plates and the third plate, air passageways between the springs and the third plate, and air impelling vanes on said third plate extending into said passageways.

16. In a wheel, a hub having two main relatively movable plates radiating therefrom, a tire carrying plate between said main plates, springs comprising elastic shear elements interposed between said tire carrying plate and each of said main plates, air passageways between said springs and said tire carrying plate, and means for inducing an air flow through said passageways incident to rotation of the wheel.

17. In a wheel, a hub having two main relatively movable plates radiating therefrom, a tire carrying plate between said main plates, springs comprising elastic shear elements interposed between said tire carrying plate and each of said main plates, spacer means separating said springs from said tire carrying plate, and air impelling means between the springs and said tire carrying plate.

18. In a spring device, three parallel plates separated by springs each comprising an elastic shear element having metallic members surface bonded to opposed faces thereof, the intermediate one of said plates being relatively movable with respect to the other two plates to impose shear loading on the elements, a plurality of bolts each extending transversely through said plates, said members and said elements, and having substantial clearance with said intermediate plate, those members adjacent said intermediate plate and said shear elements, said bolts having nuts on each end thereof to draw said plates toward each other thereby imposing substantial compression on said elements, said bolts each having a shoulder near each end thereof and a portion comprising dowel means for securing those members adjacent said other plates to said other plates, and means concentric with said bolts and having one part thereof anchored in an opening through said intermediate plate and another part engaging an opening through each of said members adjacent said intermediate plate.

EMIL H. PIRON.